United States Patent
Ueda (10) Patent No.: US 7,821,320 B2
(45) Date of Patent: Oct. 26, 2010

(54) TEMPERATURE DETECTION CIRCUIT

(75) Inventor: Susumu Ueda, Okazaki (JP)

(73) Assignee: DENSO CORPORATION, Kariya (JP)

( * ) Notice: Subject to any disclaimer, the term of this patent is extended or adjusted under 35 U.S.C. 154(b) by 302 days.

(21) Appl. No.: 12/010,902

(22) Filed: Jan. 31, 2008

(65) Prior Publication Data

US 2008/0187026 A1  Aug. 7, 2008

(30) Foreign Application Priority Data

Feb. 7, 2007  (JP)  ............... 2007-027958
Jul. 12, 2007  (JP)  ............... 2007-183211

(51) Int. Cl.
*H01L 35/00* (2006.01)
(52) U.S. Cl. ............... 327/512; 327/83; 327/513
(58) Field of Classification Search ............... 327/83, 327/262, 512, 513
See application file for complete search history.

(56) References Cited

U.S. PATENT DOCUMENTS

| | | | |
|---|---|---|---|
| 5,619,430 A | 4/1997 | Nolan et al. | |
| 5,961,215 A * | 10/1999 | Lee et al. | ............... 374/178 |
| 6,157,244 A * | 12/2000 | Lee et al. | ............... 327/539 |
| 6,531,911 B1 | 3/2003 | Hsu et al. | |
| 6,811,309 B1 | 11/2004 | Ravishanker | |
| 6,870,421 B2 | 3/2005 | Abe | |
| 6,876,250 B2 | 4/2005 | Hsu et al. | |
| 6,888,397 B2 | 5/2005 | Tsuchiya | |
| 7,176,701 B2 | 2/2007 | Wachi et al. | |
| 7,581,882 B2 * | 9/2009 | Noguchi | ............... 374/178 |
| 2005/0105586 A1 | 5/2005 | Sato | |
| 2005/0275024 A1 * | 12/2005 | Yeo et al. | ............... 257/347 |
| 2007/0146047 A1 * | 6/2007 | Senriuchi et al. | ............... 327/512 |

FOREIGN PATENT DOCUMENTS

JP  A-07-027629  1/1995

OTHER PUBLICATIONS

Office Action dated May 25, 2009 from the German Patent Office in the corresponding DE Application No. 10 2008 000 230.5-52 (and English Translation).

* cited by examiner

*Primary Examiner*—Lincoln Donovan
*Assistant Examiner*—Ryan C Jager
(74) *Attorney, Agent, or Firm*—Posz Law Group, PLC (57) ABSTRACT

A temperature detection circuit includes a bandgap reference voltage generation circuit, a detection output circuit, and an output conversion circuit. The bandgap reference voltage generation circuit generates a first reference voltage and causes a bias current to flow through a current path to produce a thermal voltage. The current path has a first resistor. The detection output circuit has a second resistor and causes a mirror current of the bias current to flow through the second resistor. The output conversion circuit uses a second reference voltage to convert a voltage drop across the second resistor to a predetermined output form to detect a temperature. The first and second resistors are substantially identical in temperature dependence. The second reference voltage is generated from the first reference voltage.

9 Claims, 13 Drawing Sheets

TEMPERATURE DETECTION CIRCUIT

CROSS REFERENCE TO RELATED APPLICATION

This application is based on and incorporates herein by reference Japanese Patent Applications No. 2007-27958 filed on Feb. 7, 2007 and No. 2007-183211 filed on Jul. 12, 2007.

FIELD OF THE INVENTION

The present invention relates to a temperature detection circuit that detects a temperature by using a thermal voltage generated by a bias current flowing in a bandgap reference voltage generation circuit.

BACKGROUND OF THE INVENTION

Figure 14:
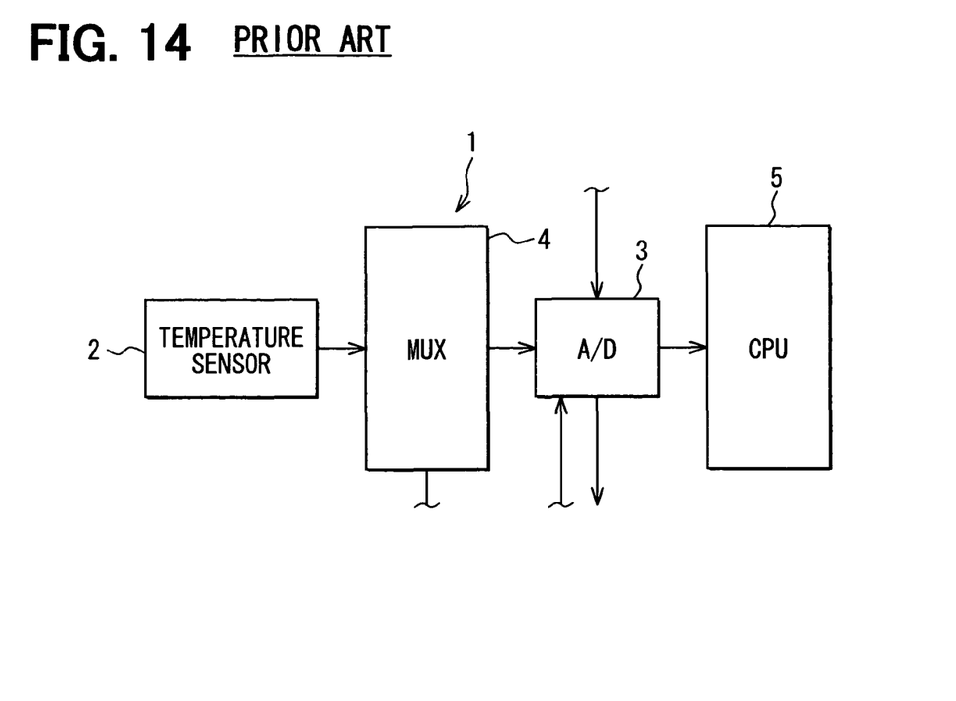
FIG. 14 is a block diagram illustrating a conventional microcontroller.
Figure 15:
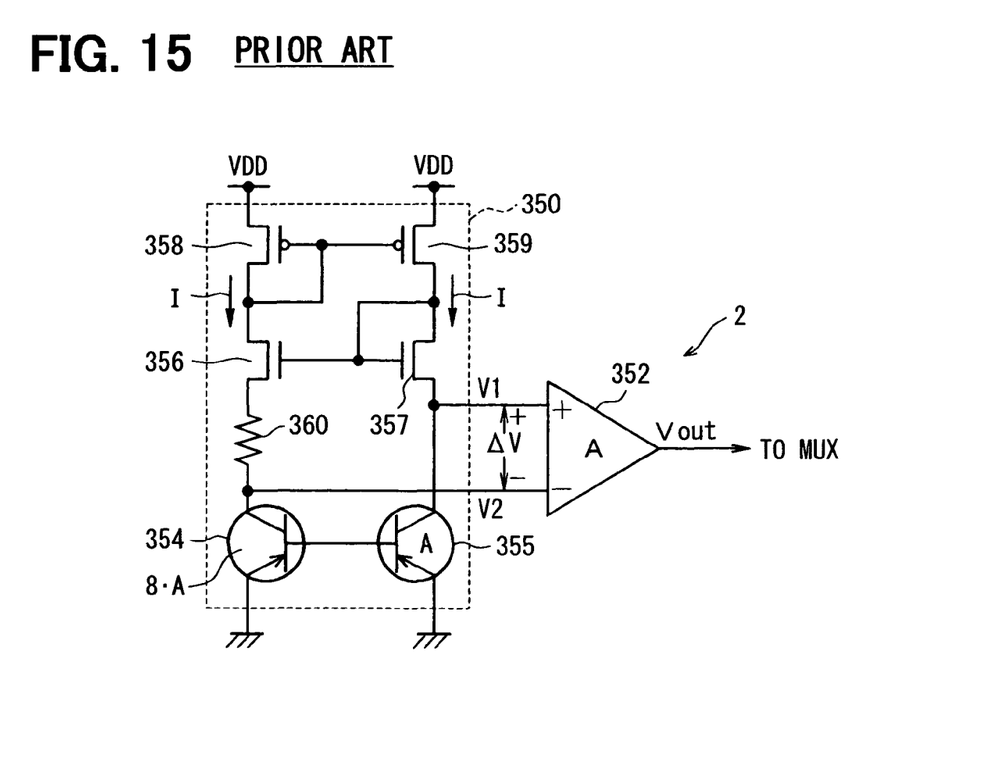
FIG. 15 is a circuit diagram illustrating a conventional temperature used in the microcontroller of FIG. 14.

A microcontroller illustrated 1 in FIG. 14 has been disclosed in U.S. Pat. No. 5,619,430 corresponding to JP-A-H10-503611. The microcontroller 1 includes a temperature sensor 2. As illustrated in FIG. 15, the temperature sensor 2 includes a ΔVbe generator 350 and a differential amplifier 352 for generating an output voltage Vout, which is supplied to one input of a multiplexer (MUX) 4 for sampling by a slope analog-to-digital (A/D) converter 3.

The ΔVbe generator 350 includes PNP bipolar transistors 354, 355 having bases connected to each other and emitters connected to a ground. A collector of the transistor 354 is coupled through a resistor 360 to a source of a N-channel metal-oxide semiconductor (MOS) transistor 356, and a collector of the transistor 355 is coupled to a source of a N-channel MOS transistor 357.

The transistors 356-359 supply a bias current I to the collectors of the transistors 354, 355. The transistors 354, 355 are designed such that the area of each emitter is different. A difference in base-emitter voltages across the transistors 354, 355 appears across the resistor 360, as denoted by ΔV. The amplifier 352 amplifies the voltage ΔV by an amplification gain A. Therefore, the output voltage Vout is expressed as follows by using a temperature T: Vout=ΔV×A=K1×T. Since K1 is a constant, the output voltage Vout changes linearly with the temperature T.

The A/D converter 3 samples the output voltage Vout of the amplifier 352, and a central processing unit (CPU) 5 receives a digital value corresponding to the output voltage Vout from the A/D converter 3. In order to obtain an absolute temperature, the microcontroller 10 is calibrated at factory test whereby the output voltage of the temperature sensor 2 is measured at two different temperatures. This will enable one to obtain calibration constants Kthrm and Ktc. The CPU 5 corrects the temperature detected by the temperature sensor 2 by using the calibration constants Kthrm and Ktc.

However, in the microcontroller 1 disclosed in U.S. Pat. No. 5,619,430, the CPU 5 performs the correction of the temperature by software. Further, regarding the A/D converter 3, the CPU 5 must perform correction by using a calibration constant Kref to determine coefficients of a linear transfer function. Therefore, complex correction procedures are required to accurately detect a temperature.

SUMMARY OF THE INVENTION

In view of the above-described problem, it is an object of the present invention to provide a temperature detection circuit for accurately detecting a temperature without a complex correction procedure.

According to an aspect of the present invention, a temperature detection circuit includes a bandgap reference voltage generation circuit, a detection output circuit, and an output conversion circuit. The bandgap reference voltage generation circuit generates a first reference voltage and causes a bias current to flow through a current path to produce a thermal voltage. The current path has a first resistor. The detection output circuit includes a second resistor and causes a mirror current of the bias current to flow through the second resistor. The output conversion circuit uses a second reference voltage to convert a voltage drop across the second resistor to a predetermined output form to detect a temperature. The first and second resistors are substantially identical in temperature dependence. The second reference voltage is generated from the first reference voltage.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

First Embodiment

Figure 1:
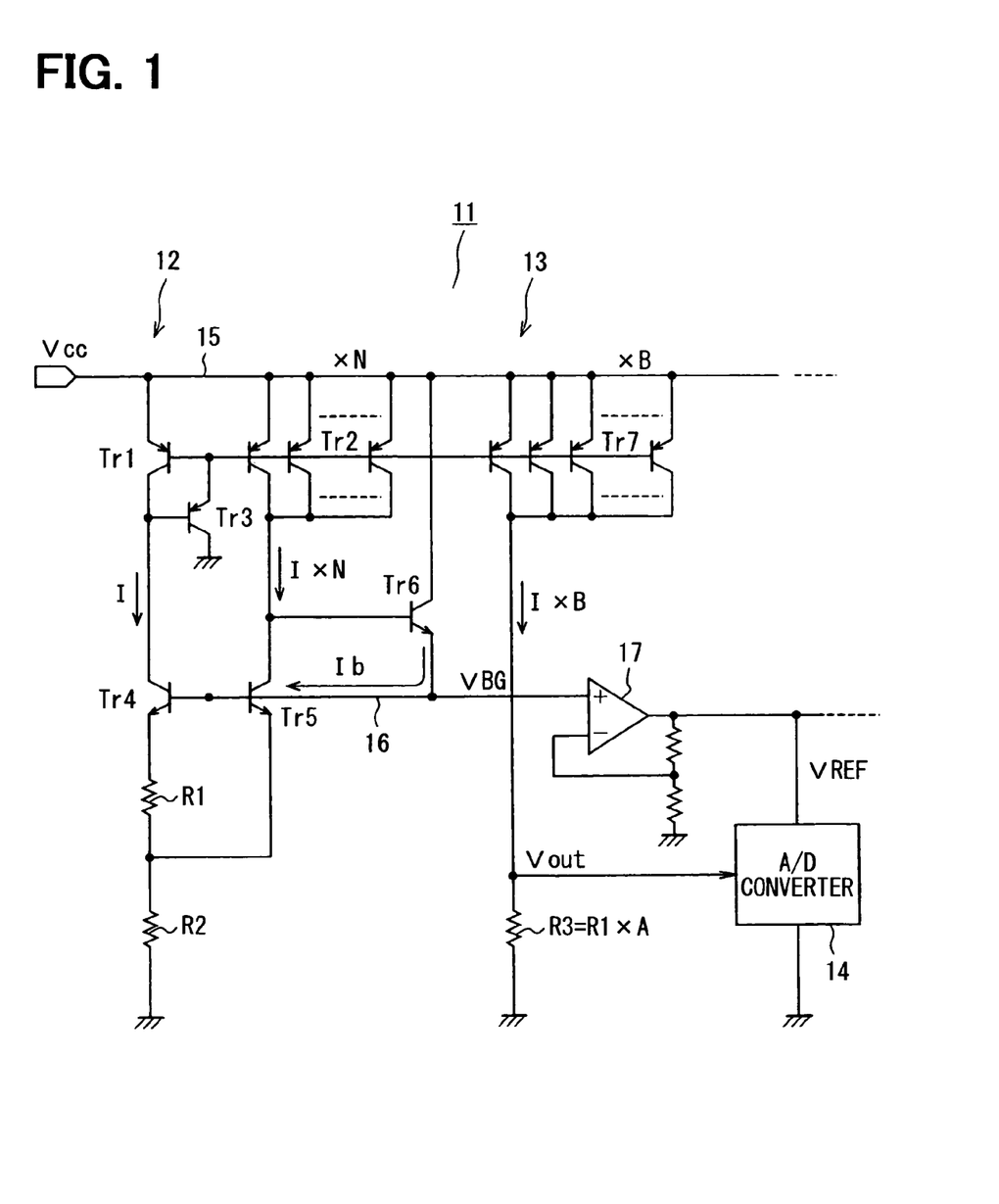
FIG. 1 is a circuit diagram illustrating a temperature detection circuit according to a first embodiment of the present invention.

Referring to FIG. 1, a temperature detection circuit 11 according to a first embodiment of the present invention includes a bandgap reference voltage (VBG) generator 12, a detection output circuit 13, and an analog-to-digital (A/D) converter 14.

The VBG generator 12 is configured to output a bandgap reference voltage VBG through an output line 16. In the VBG generator 12, PNP transistors Tr1, Tr2 construct a first current mirror circuit. The bases of the transistors Tr1, Tr2 are coupled together, and the emitters of the transistors Tr1, Tr2 are coupled to a power line 15 of a power supply voltage Vcc. The transistors Tr1, Tr2 are designed such that a cell area ratio (i.e., emitter ratio) is set to 1:N, where N is a positive number. Therefore, a first mirror current as a collector current of the transistor Tr2 is N times greater than a bias current I as a collector current of the transistor Tr1. The emitter of PNP transistor Tr3 is coupled to the bases of the transistors Tr1, Tr2, the base of the transistor Tr3 is coupled to the collector of the transistor Tr1, and the collector of the transistor Tr3 is coupled to a ground. A base current of the transistors Tr1, Tr2 flows into the ground through the transistor Tr3. NPN transistors Tr4, Tr5 are matched. Specifically, the transistors Tr4, Tr5 have the same cell area and identical electrical characteristics.

The bases of the transistors Tr4, Tr5 are coupled together to the output line 16 so that a base current Ib can be supplied to the bases of the transistors Tr4, Tr5 through the output line 16. The emitter of the transistor Tr4 is coupled to the ground through a series circuit of resistors R1, R2. The emitter of the transistor Tr5 is coupled to a junction between the resistors R1, R2. The collector of NPN transistor Tr6 is coupled to the power line 15, the base of the transistor Tr6 is coupled to the collector of the transistor Tr5, and the emitter of the transistor Tr6 is coupled to the output line 16. The base current Ib of the transistors Tr4, Tr5 serves as a feedback current to maintain the bandgap reference voltage VBG at a constant level. The amount of an electric current flowing from the collector of the transistor Tr5 to the base of the transistor Tr6 changes with the amount of the base current Ib of the transistors Tr4, Tr5. Accordingly, an emitter current of the transistor Tr6 changes so that the bandgap reference voltage VBG is maintained at the constant level.

In the detection output circuit 13, the emitter of PNP transistor Tr7 is coupled to the power line 15, and the collector of the transistor Tr7 is coupled to the ground through a detection resistor R3. The base of the transistor Tr7 is coupled to the base of the transistor Tr1 so that the transistors Tr1, Tr7 construct a second current mirror circuit. The transistors Tr1, Tr7 are designed such that a cell area ratio (i.e., emitter ratio) is set to 1:B, where B is a positive number. Therefore, a second mirror current as a collector current of the transistor Tr7 is B times greater than the bias current I as the corrector current of the transistor Tr1.

The detection resistor R3 has the same temperature dependence as the resistor R1 and has a resistance A times greater than a resistance of the resistor R1, where A is a positive number. A temperature detection Vout appears across the detection resistor R3 and is converted to voltage data by the A/D converter 14. The voltage data is read by a central processing unit (not shown), for example. The bandgap reference voltage VBG outputted from the VBG generator 12 is amplified through a non-inverting amplifier 17 to an A/D conversion reference voltage VREF. The A/D conversion reference voltage VREF is supplied to the A/D converter 14, and the A/D converter 14 converts the temperature detection voltage Vout to the voltage data by using the A/D conversion reference voltage VREF.

The VBG generator 12 generates the bandgap reference voltage VBG using both a thermal voltage VT and a base-emitter voltage VBE. While the thermal voltage VT has a positive temperature dependence, the base-emitter voltage VBE has a negative temperature dependence. Therefore, the bandgap reference voltage VBG has no temperature dependence. The second mirror current, which is B times greater than the bias current I flowing through the resistor R1, flows through the detection resistor R3. Thus, the temperature detection voltage Vout appearing across the detection resistor R3 changes with a temperature. Since the detection resistor R3 has the same temperature dependence as the resistor R1, the temperature detection voltage Vout has no error resulting from a difference in temperature dependence between the resistors R1, R3.

The voltage drop across the resistor R1 is equal to a base-emitter voltage VBE of the transistor Tr5. Therefore, the voltage drop across the resistor R1 is expressed by the following equation:

$$R1 \cdot I = VBE = VT \cdot \ln(N \cdot I/I) \tag{1}$$

In the above equation (1), ln represents natural logarithm. The thermal voltage VT is expressed as follows: $VT = k \cdot T/q$, where k is Boltzmann's constant, T is absolute temperature, and q is the electronic charge. The bias current I is expressed by the following equation:

$$I = k \cdot T/q \cdot \ln(N)/R1 \tag{2}$$

Since the second mirror current flowing through the detection resistor R3 is B times greater than the bias current I, the temperature detection voltage Vout outputted from the detection output circuit 13 is expressed by the following equation:

$$Vout = R3 \cdot B \cdot I = R3 \cdot B \cdot \{k \cdot T/q \cdot \ln(N)/R1\} = k/q \cdot A \cdot B \cdot \ln(N) \cdot T \tag{3}$$

Therefore, the output voltage Vout can be expressed by using a constant value C as follows.

$$Vout = C \cdot T \tag{4}$$

As can be seen from the above equation (4), the temperature detection voltage Vout changes lineally with the temperature T at a constant slope of C without being affected by manufacturing variation in the base-emitter voltage VBE. The constant slope of C can be adjusted by adjusting the first mirror ratio N in the VBG generator 12 and the resistance ratio A and the second mirror ratio B in the detection output circuit 13.

The A/D conversion reference voltage VREF supplied to the A/D converter 14 is generated from the bandgap reference voltage VBG outputted from the VBG generator 12. Thus, since a characteristic related to an A/D conversion action of the A/D converter 14 depends on a characteristic of the bandgap reference voltage VBG, there is no need of a correction for the A/D converter 14.

As described above, according to the first embodiment of the present invention, the detection output circuit 13 of the temperature detection circuit 11 causes the second mirror current B times greater than the bias current I, which flows through the resistor R1 and produces the thermal voltage VT, to flow through the detection resistor R3. The A/D converter 14 converts the temperature detection voltage Vout, which appears across the detection resistor R3, to the voltage data by using the conversion reference voltage VREF. The detection resistor R3 has the same temperature dependence as the resistor R1, and the conversion reference voltage VREF is generated from the bandgap reference voltage VBG. Thus, unlike the prior art illustrated in FIGS. 14, 15, the temperature detection circuit 11 can accurately detect a temperature without complex calibration.

Second Embodiment

Figure 2:
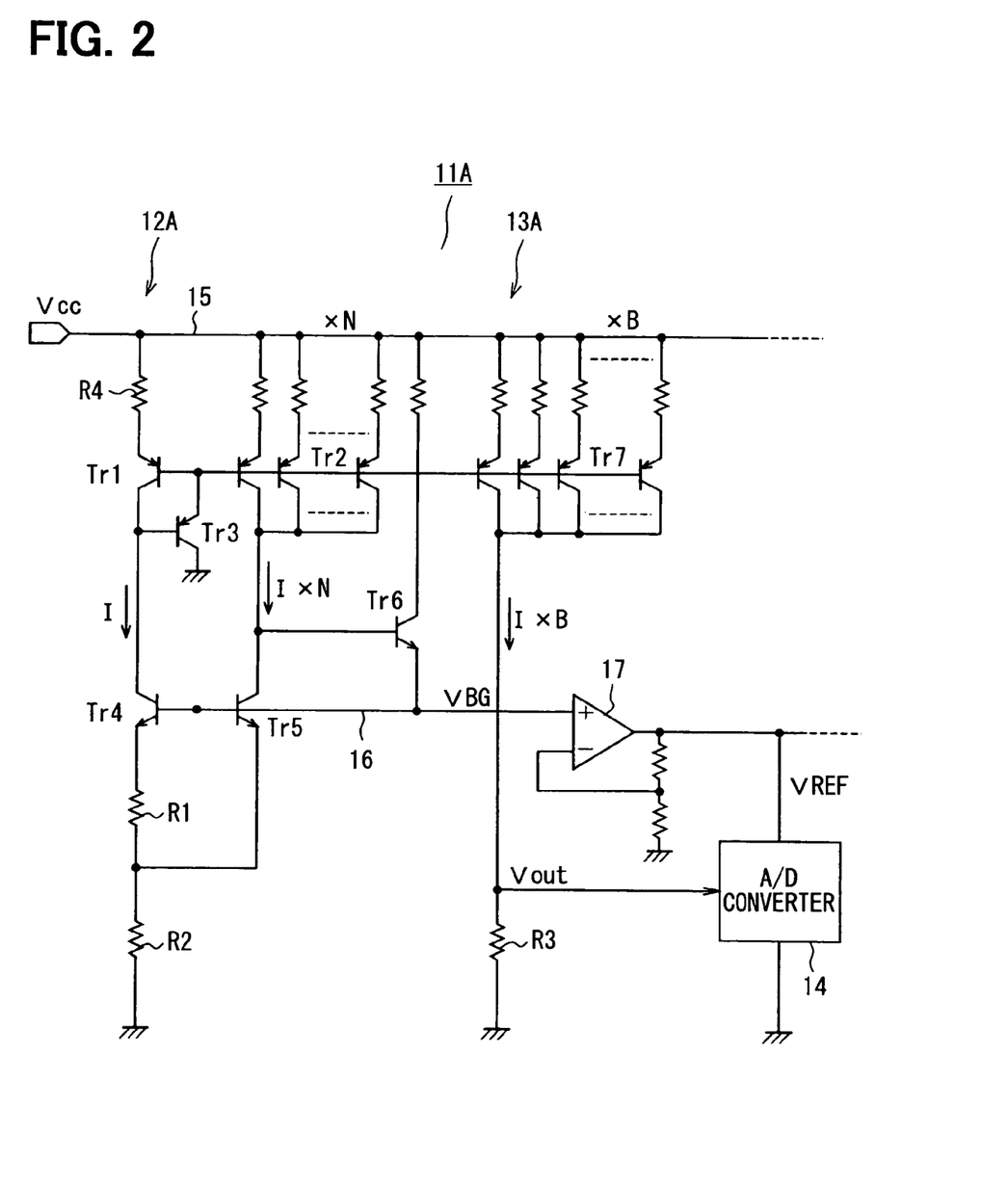
FIG. 2 is a circuit diagram illustrating a temperature detection circuit according to a second embodiment of the present invention.

A temperature detection circuit 11A according to a second embodiment of the present invention is described below with reference to FIG. 2. A difference between the temperature detection circuits 11, 11A is as follows. The temperature detection circuit 11A further includes a resistor R4 coupled between the power line 15 and each emitter of the transistors Tr1, Tr2, Tr7. In such an approach, a mirror ratio N of a first current mirror circuit in a VBG generator 12A and a mirror ratio B of a second current mirror circuit in a detection output circuit 13A can be preciously adjusted so that the temperature detection circuit 11A can more accurately detect a temperature.

Third Embodiment

Figure 3:
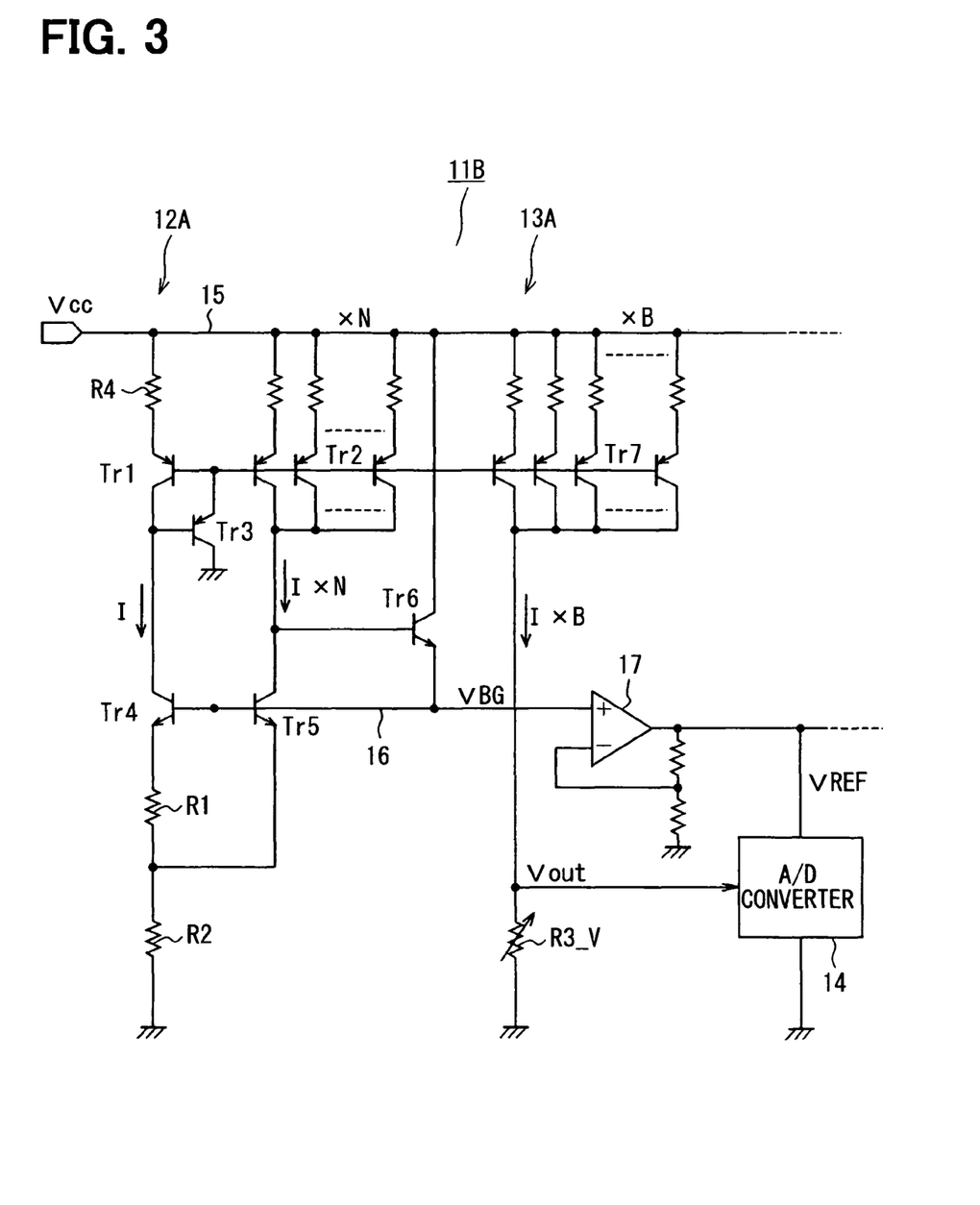
FIG. 3 is a circuit diagram illustrating a temperature detection circuit according to a third embodiment of the present invention.

A temperature detection circuit 11B according to a third embodiment of the present invention is described below with reference to FIG. 3. A difference between the temperature detection circuits 11A, 11B is as follows. The temperature detection circuit 11B includes a variable detection resistor R3_V instead of the detection resistor R3. In such an approach, the mirror ratio B of the second current mirror circuit in the detection output circuit 13A can be easily adjusted by changing a resistance of the variable detection resistor R3_V. Thus, the constant slope of C, at which the temperature detection voltage Vout changes lineally with the temperature T, can be easily adjusted using the variable detection resistor R3_V.

Fourth Embodiment

Figure 4:
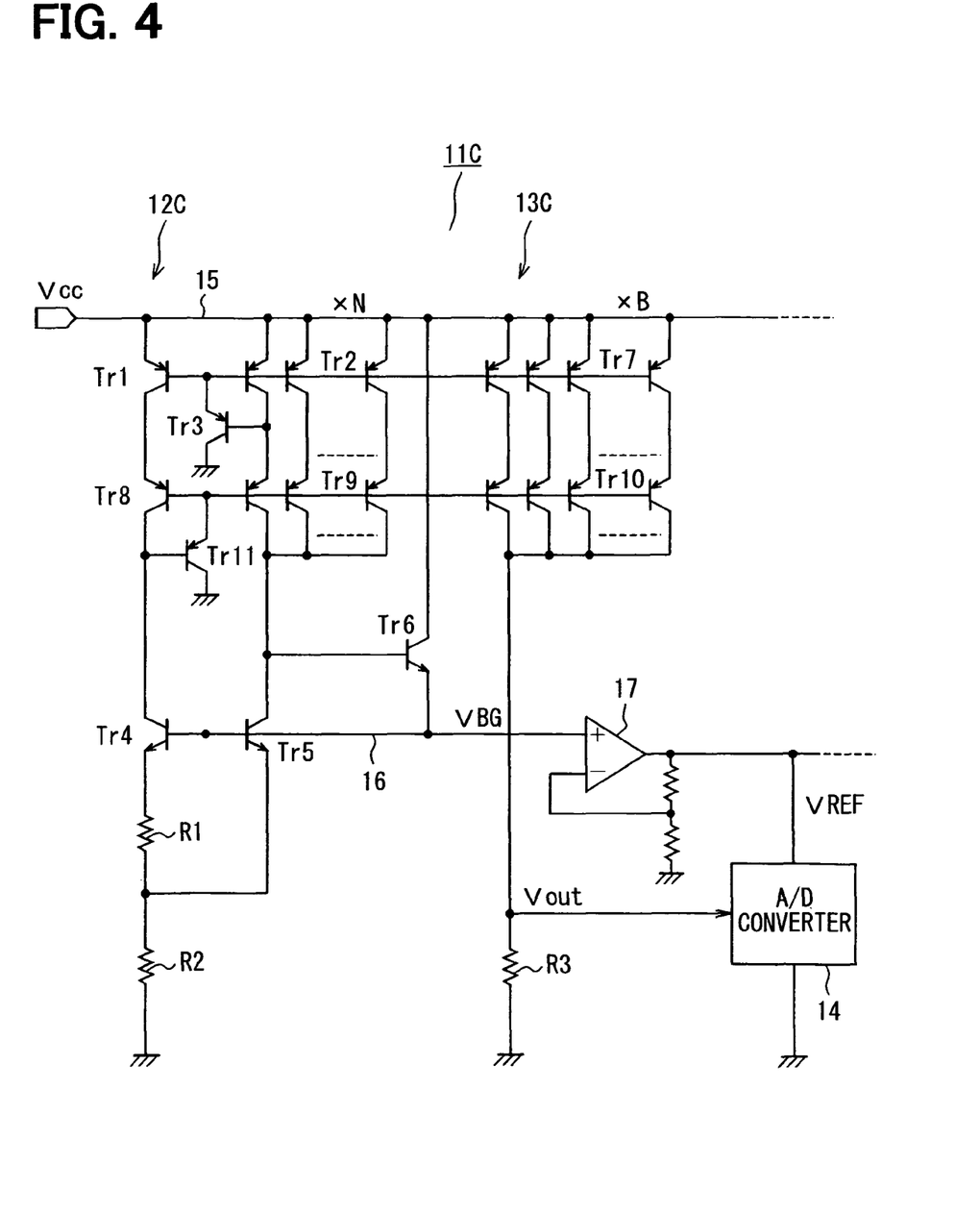
FIG. 4 is a circuit diagram illustrating a temperature detection circuit according to a fourth embodiment of the present invention.

A temperature detection circuit 11C according to a fourth embodiment of the present invention is described below with reference to FIG. 4. A difference between the temperature detection circuits 11, 11C is as follows. A VBG generator 12C of the temperature detection circuit 11C further includes PNP transistors Tr8, Tr9 coupled in cascade with the transistors Tr1, Tr2, respectively. A detection output circuit 13C of the temperature detection circuit 11C further includes a PNP transistor Tr10 coupled in cascade with the transistors Tr7. A PNP transistor Tr11 is coupled between the ground and each base of the transistors Tr8, Tr9. The transistor Tr11 serves the same function as the transistor Tr3. To improve accuracy of a mirror ratio, the base of the transistor Tr3 is coupled to the collector of the transistor Tr2, and the base of the transistor Tr11 is coupled to the collector of the transistor Tr8.

According to the fourth embodiment, the transistors Tr1, Tr2, Tr7 are coupled in cascade with the transistors Tr8, Tr9, Tr10, respectively. In such an approach, each transistor can have substantially the same collector-emitter voltage so that the temperature detection circuit 11C can more accurately detect the temperature.

Fifth Embodiment

Figure 5:
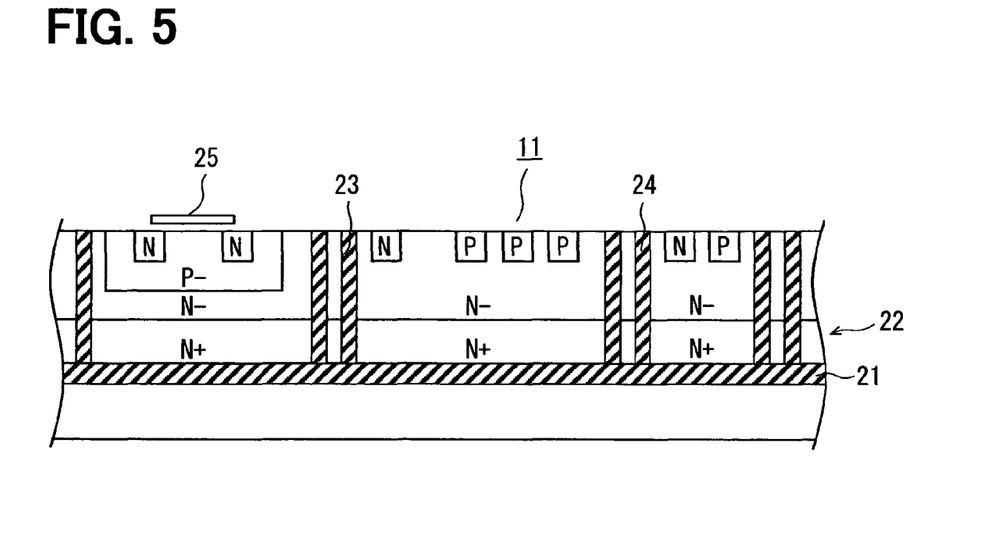
FIG. 5 is a diagram illustrating a cross-sectional view of a semiconductor substrate where the temperature detection circuit of FIG. 1 is formed.

A fifth embodiment of the present invention is described below with reference to FIG. 5. As illustrated in FIG. 5, the above-described temperature detection circuits can be implemented on a semiconductor substrate. For example, in the case of the temperature detection circuit 11 of the first embodiment, circuit elements of the VBG generator 12 and the detection output circuit 13 are formed on a silicon-on-insulator (SOI) substrate 22 having a buried oxide layer 21. A trench-isolated region is formed to the SOI substrate 22 by forming a trench 23 reaching the buried oxide layer 21 to the SOI substrate 22 and filling the trench 23 with an electrically insulating material such as an oxide material. The circuit elements such as PNP transistors are formed within the trench-isolated region.

In such an approach, the VBG generator 12 and the detection output circuit 13 are electrically isolated from other circuit elements by the oxide layer. A thermal conductivity in an oxide layer isolation structure is about one-tenth of a thermal conductivity in a PN junction isolation structure. Therefore, as shown in FIG. 5, even when a heat-generating element such as a power metal-oxide semiconductor field-effect transistor (MOSFET) 25 is formed near the temperature detection circuit 11, the temperature detection circuit 11 can accurately detect a temperature without being affected by heat from the MOSFET 25. For example, the temperature detection circuit 11 can be integrated in a driver integrated circuit (IC) for driving an actuator and can reliably detect a temperature of the actuator without being affected by heat from a driving element (e.g., power MOSFET) integrated in the driver IC.

Sixth Embodiment

Figure 6:
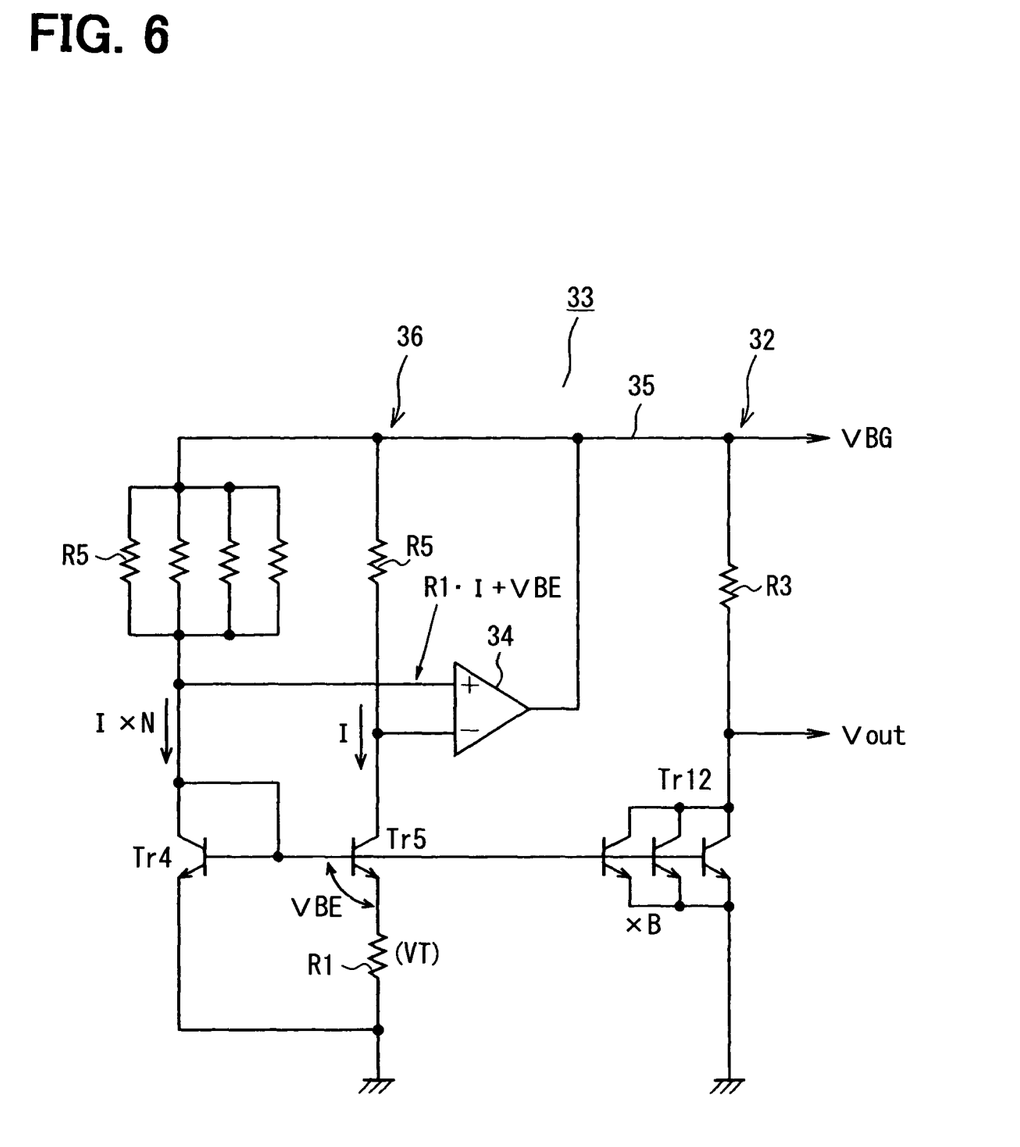
FIG. 6 is a circuit diagram illustrating a temperature detection circuit according to a sixth embodiment of the present invention.

A temperature detection circuit 33 according to a sixth embodiment of the present invention is described below with reference to FIG. 6. A difference between the temperature detection circuits 11, 33 is as follows. In a VBG generator 36 of the temperature detection circuit 33, bases of transistors Tr4, Tr5 are coupled together to construct a current mirror circuit. A resistor R5 is coupled between an output line 35 for outputting the bandgap reference voltage VBG and the collector of the transistor Tr5. A parallel circuit of N (four in FIG. 6) resistors R5 is coupled between the output line 35 and the collector of the transistor Tr4. The emitter of the transistor Tr5 is coupled to a ground through a resistor R1, and the emitter of the transistor Tr4 is directly coupled to the ground. The collector of the transistor Tr4 is coupled to a non-inverting input of an operational amplifier (op-amp) 34, and the collector of the transistor Tr5 is coupled to an inverting input of the op-amp 34. An output of the op-amp 34 is coupled to the output line 35.

In a detection output circuit 32 of the temperature detection circuit 33, a detection resistor R3 is coupled to the output line 35, and the base of a transistor Tr12 is coupled to each base of the transistors Tr4, Tr5.

Due to the function of the op-amp 34, each collector potential of the transistors Tr4, Tr5 becomes "R1·I+VBE". Therefore, a collector current of the transistor Tr4 becomes "N·I".

Figure 7A:
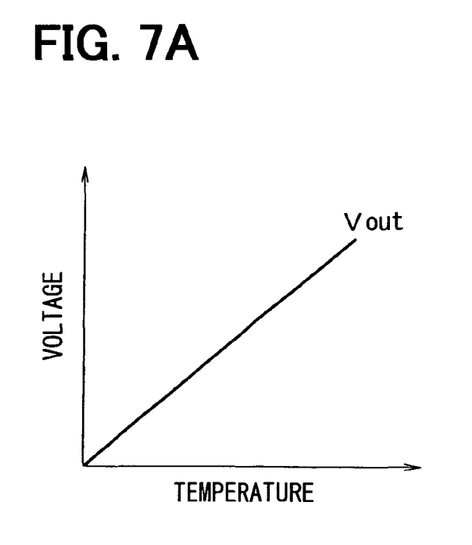
FIG. 7A is a graph illustrating a relationship between a detected temperature and a temperature detection voltage of the temperature detection circuit of FIG. 1.
Figure 7B:
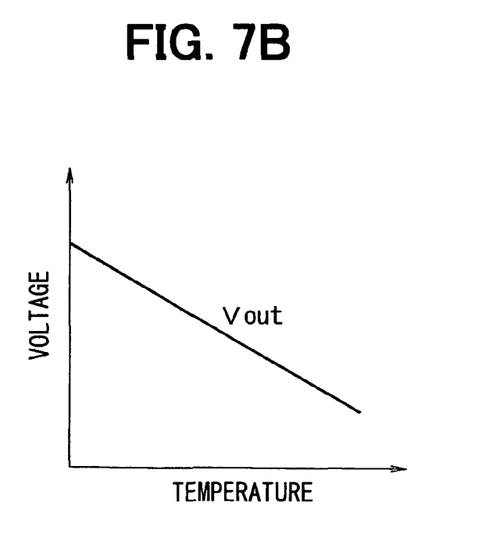
FIG. 7B is a graph illustrating a relationship between a detected temperature and a temperature detection voltage of the temperature detection circuit of FIG. 6.

FIGS. 7A, 7B shows a relationship between a temperature and a temperature detection voltage Vout appearing across the detection resistor R3. In the case of the temperature detection circuit 11 of the first embodiment, as shown in 7A, the temperature detection voltage Vout has a positive temperature dependence and increases linearly with an increase in the temperature. In the case of the temperature detection circuit 33 of the sixth embodiment, as shown in 7B, the temperature detection voltage Vout has a negative temperature dependence and decreases linearly with an increase in the temperature. Thus, when it is required that the temperature detection voltage Vout should have a negative temperature dependence, the temperature detection circuit 33 according to the sixth embodiment can meet the requirement.

Seventh Embodiment

Figure 8:
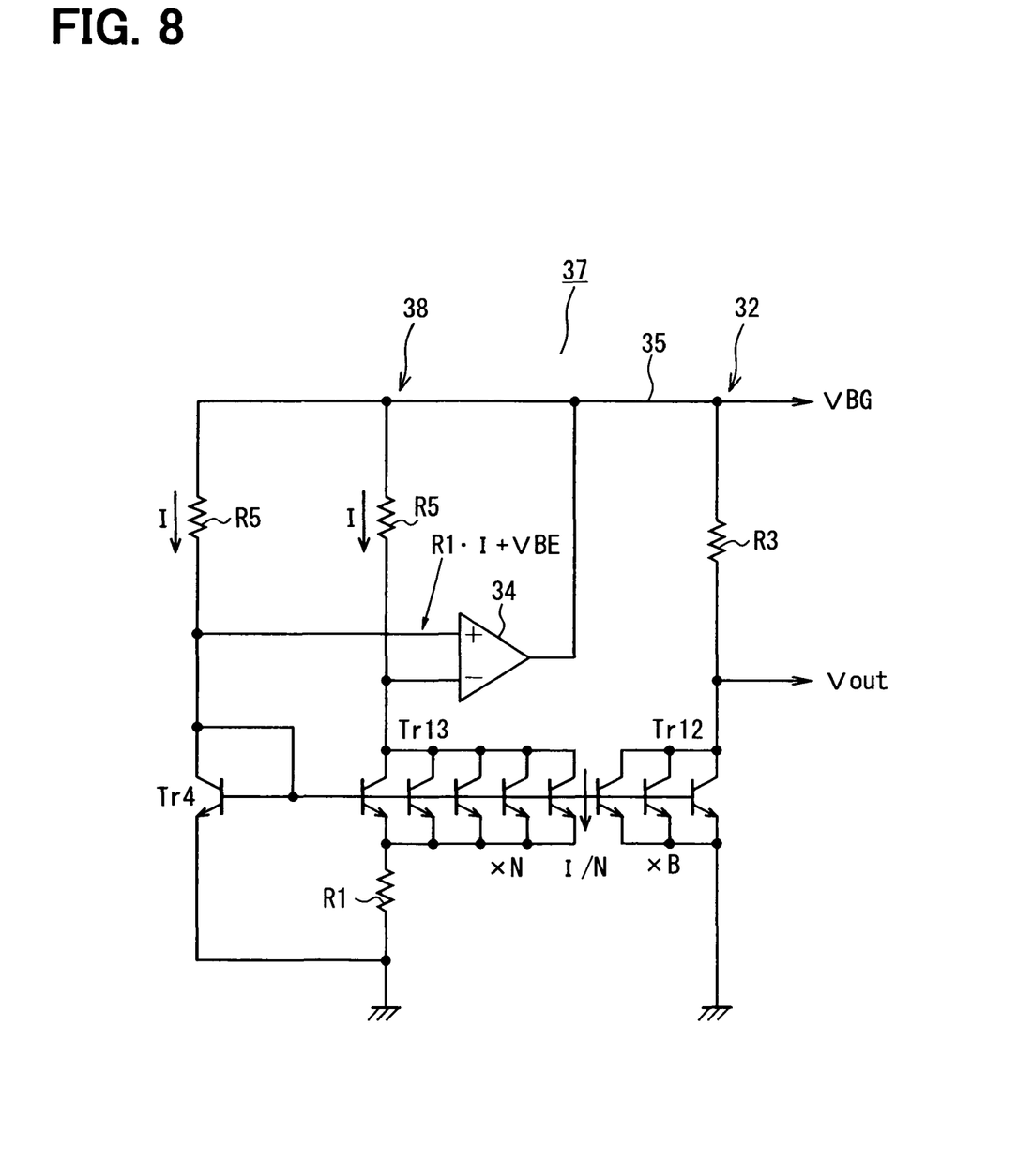
FIG. 8 is a partially circuit diagram illustrating a temperature detection circuit according to a seventh embodiment of the present invention.

A temperature detection circuit 37 according to a seventh embodiment of the present invention is described below with reference to FIG. 8. A difference between the temperature detection circuits 33, 37 is as follows. In a VBG generator 38 of the temperature detection circuit 37, a transistor 7 is used instead of the transistor 5. A cell area of the transistor 7 is N times greater than that of the transistor 7. Further, while the parallel circuit of N resistors R5 is coupled between the output line 35 and the collector of the transistor Tr4 in the VBG generator 36 of the temperature detection circuits 33, only one resistor R5 is coupled between the output line 35 and the collector of the transistor Tr4 in the VBG generator 38 of the temperature detection circuits 37. In such an approach, in the VBG generator 38, a collector current of each of the transistors Tr4, Tr3 becomes I. Therefore, a collector current of each transistor element of the transistor Tr3 is one-Nth of the collector current I of the transistors Tr4.

Eighth Embodiment

Figure 9:
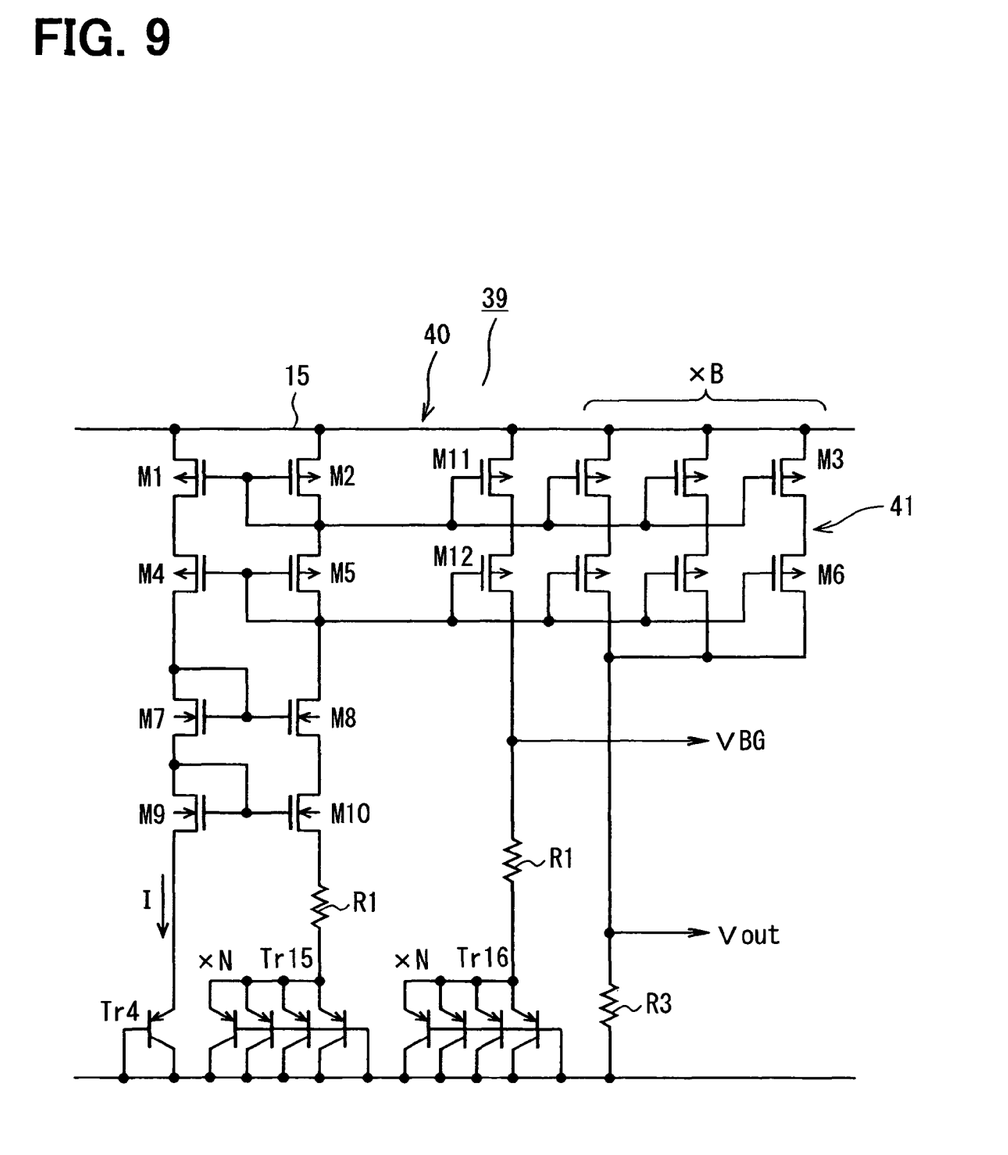
FIG. 9 is a partially circuit diagram illustrating a temperature detection circuit according to an eighth embodiment of the present invention.

A temperature detection circuit 39 according to an eighth embodiment of the present invention is described below with reference to FIG. 9. The temperature detection circuit 39 has a BiCMOS structure. In a VBG generator 40, PNP transistors Tr14-Tr16 are arranged on the ground side. The transistors Tr14, Tr15 are designed such that a cell area ratio (i.e., emitter ratio) is set to 1:N. Likewise, the transistors Tr14, Tr16 are designed such that a cell area ratio is set to 1:N. All the bases and collectors of the transistors Tr14-Tr16 are coupled to the ground. P-channel MOSFETs M1-M6 forms a corresponding cascade connection formed by the transistors Tr1, Tr2, Tr7-Tr10 of the temperature detection circuit 11C shown in FIG. 4. The MOSFET M7, M9 are coupled between the MOSFET M4 and the transistor Tr14. The MOSFET M8, M10 are coupled between the MOSFET M5 and the transistor Tr15. The MOSFET M1, M2, M4, M5, M7-M10 form a self-bias circuit. A resistor R1 is coupled between the MOSFET M10 and the transistor Tr15.

Further, in the VBG generator 40, P-channel MOSFET M11, M12 are cascaded together are coupled to a power line 15. The gates of the MOSFETs M11, M12 are coupled to the gates of the MOSFETs M2, M5, respectively. A resistor R1 is coupled between the MOSFET M12 and the transistor Tr16, and a bandgap reference voltage VBG appears at the drain of the MOSFET M12. The drain of the MOSFET M6 of a detection output circuit 41 is coupled to the ground through a detection resistor R3, and a temperature detection voltage Vout appears at the drain of the MOSFET M6.

Ninth Embodiment

Figure 10:
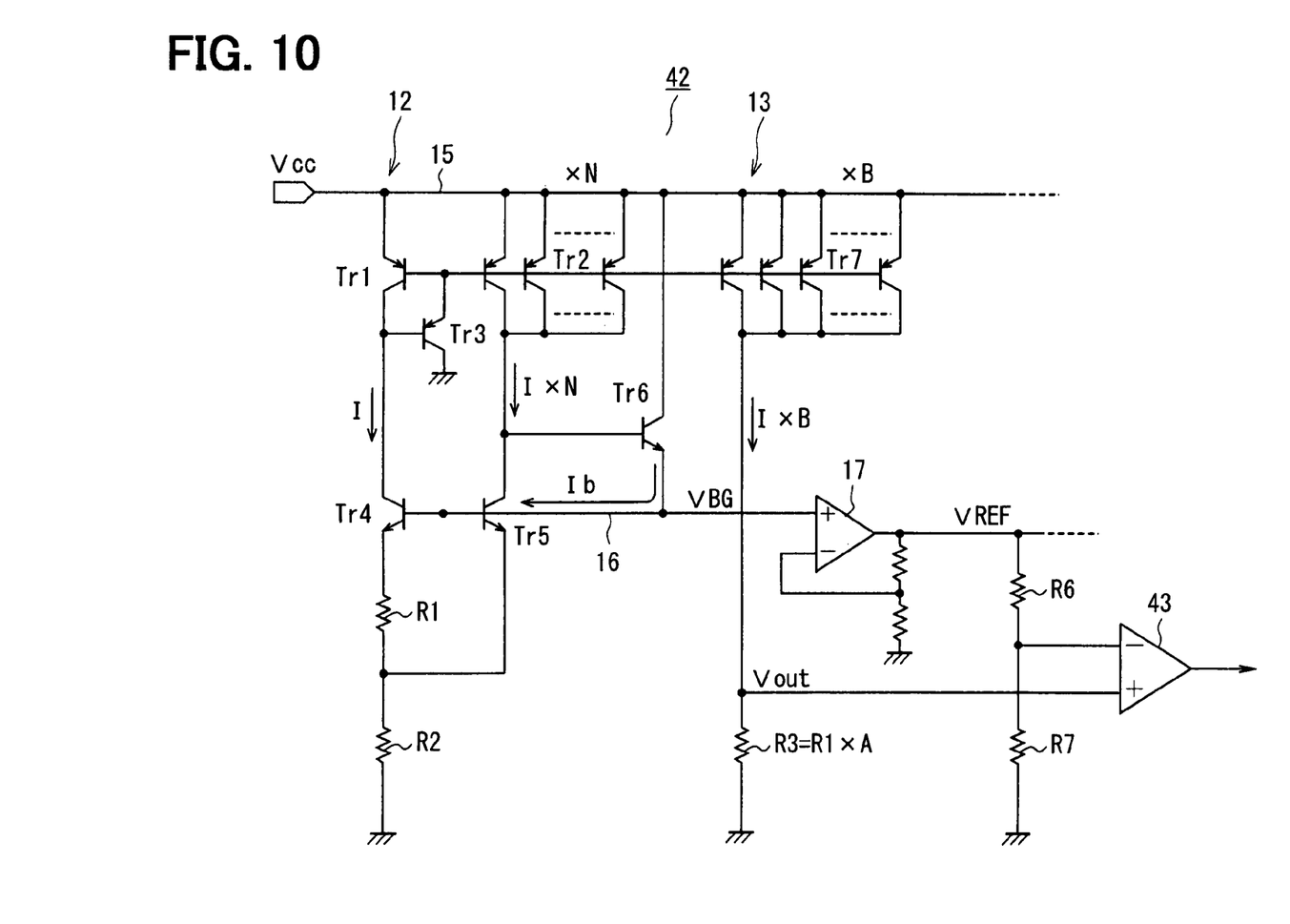
FIG. 10 is a circuit diagram illustrating a temperature detection circuit according to a ninth embodiment of the present invention.

A temperature detection circuit 42 according to a ninth embodiment of the present invention is described below with reference to FIG. 10. A difference between the temperature detection circuits 11, 42 is as follows. The temperature detection circuit 42 includes a comparator 43 instead of the A/D converter 14. A temperature detection voltage Vout is applied to a non-inverting input of the comparator 43. A conversion reference voltage VREF outputted from the non-inverting amplifier 17 is divided by a voltage divider constructed with resistors R6, R6, and the divided voltage is applied to an inverting input of the comparator 43. Since the comparator 43 uses the divided voltage generated from the conversion reference voltage VREF, the temperature detection circuit 42 can accurately detect a temperature.

Tenth Embodiment

Figure 11:
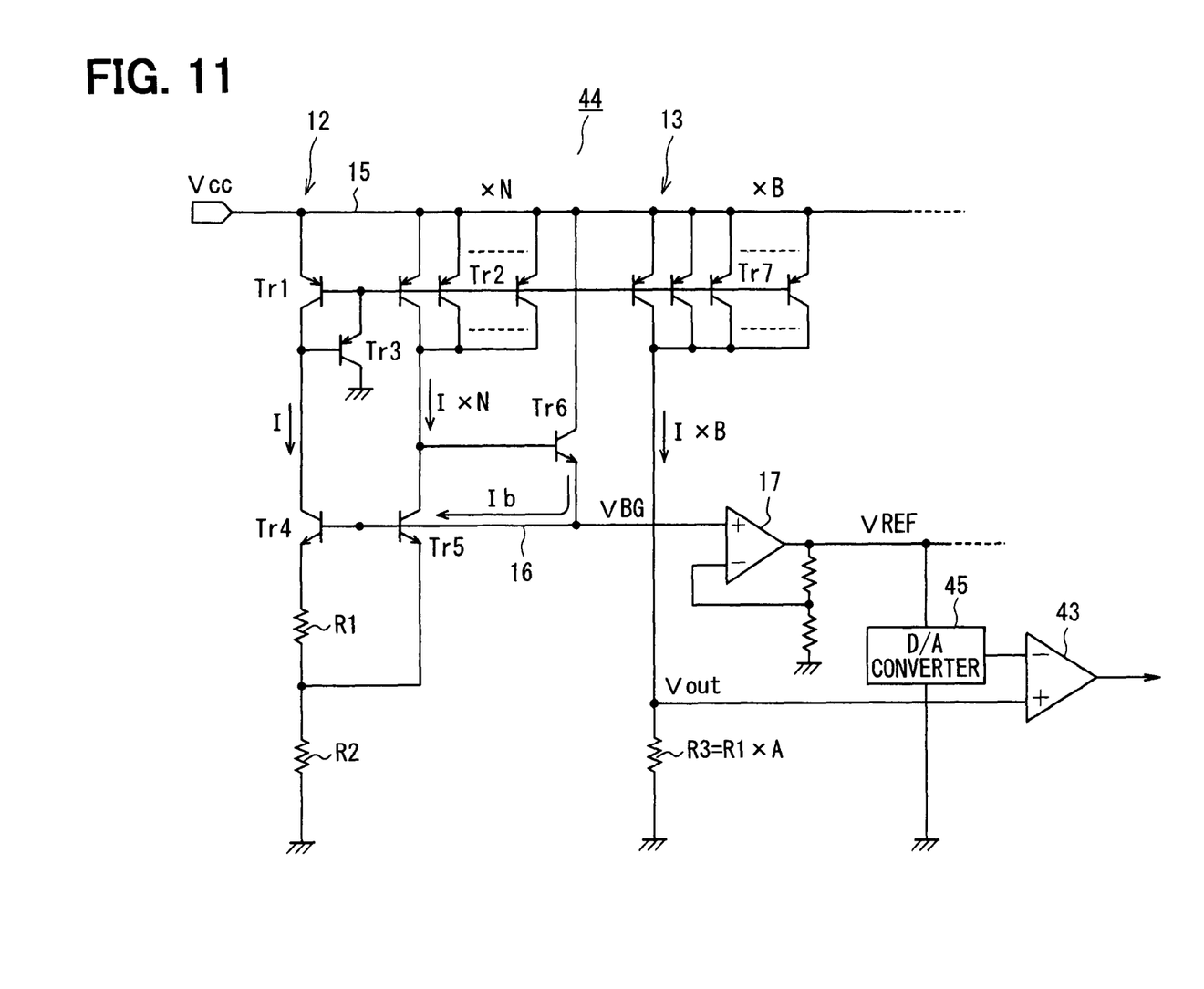
FIG. 11 is a circuit diagram illustrating a temperature detection circuit according to a tenth embodiment of the present invention.

A temperature detection circuit 44 according to a tenth embodiment of the present invention is described below with reference to FIG. 11. A difference between the temperature detection circuits 42, 44 is as follows. The temperature detection circuit 44 includes a digital-to-analog (D/A) converter 45 instead of the voltage divider constructed with the resistors R6, R7. The D/A converter 45 receives threshold voltage data from an EEPROM (not shown), for example. A conversion reference voltage VREF is supplied to the D/A converter 45. The D/A converter 45 converts the threshold voltage data to an analog threshold voltage by using the conversion reference voltage VREF. The threshold voltage is applied to the inverting input of the comparator 43. Since the comparator 43 uses the threshold voltage generated from the conversion reference voltage VREF, the temperature detection circuit 44 can accurately detect a temperature.

Eleventh Embodiment

A temperature detection circuit 54 according to an eleventh embodiment of the present invention is described below with reference to FIGS. 12, and 13A-13C. A difference between the temperature detection circuits 42, 54 is as follows. In the temperature detection circuit 54, an oscillator circuit 46 is arranged on the output side of the non-inverting amplifier 17. The oscillator circuit 46 is constructed by using the comparator 43. A series circuit of a constant current source 47 and a capacitor 48 is coupled between the output of the non-inverting amplifier 17 and the ground. A series circuit of a switch circuit 49 and a constant current source 50 is connected in parallel with the capacitor 48. The switch circuit 49 is turned on/off in accordance with an output signal of the comparator 43. For example, when the output signal is high, the switch circuit 49 is turned on. The amount of an electric current supplied by the constant current source 50 is twice greater than that of an electric current supplied by the constant current source 47.

Figure 12:
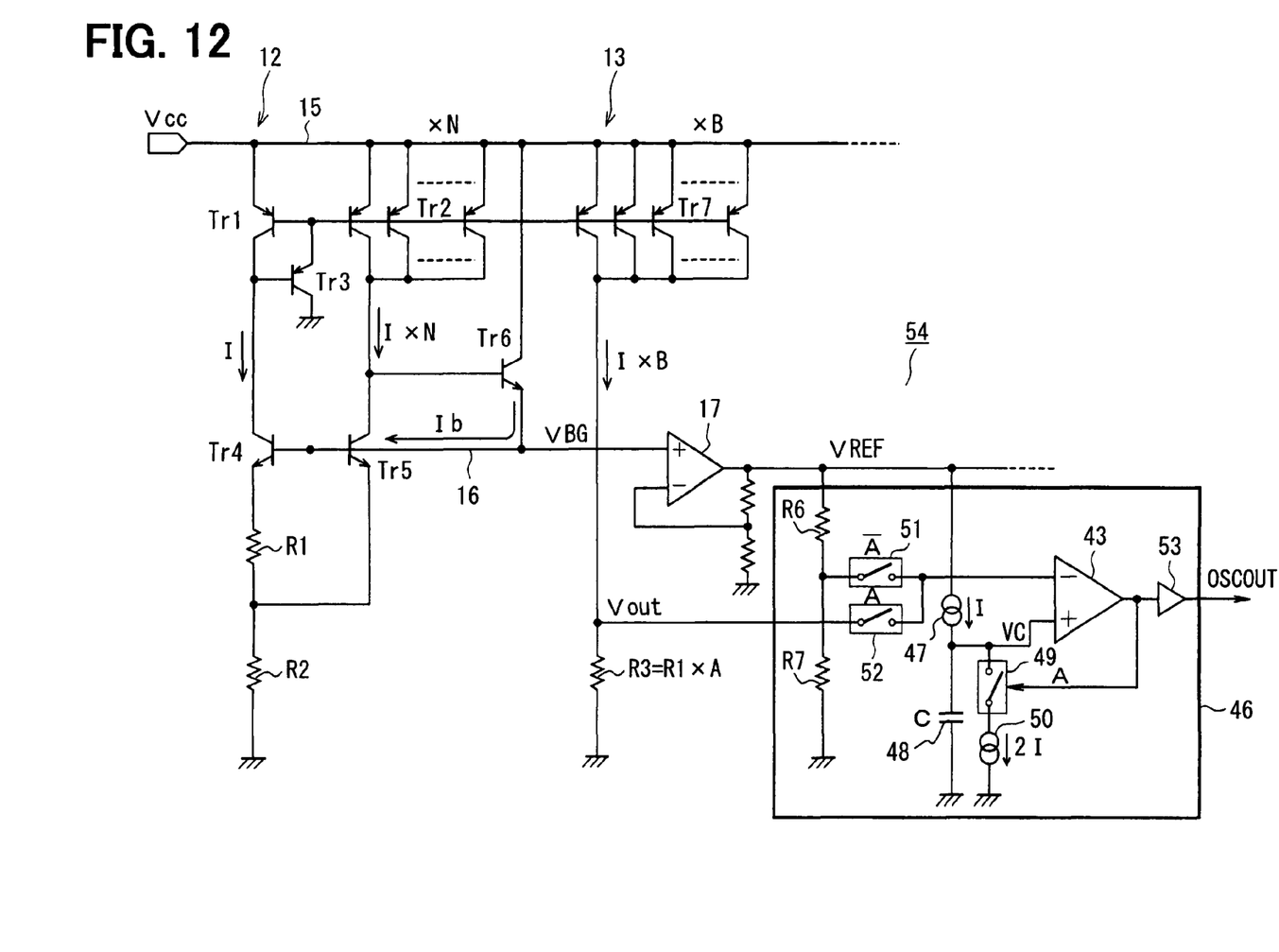
FIG. 12 is a circuit diagram illustrating a temperature detection circuit according to an eleventh embodiment of the present invention.

The junction between the resistors R6, R7 is coupled through a switch circuit 51 to the inverting input of the comparator 43. A temperature detection voltage Vout is applied through a switch circuit 52 to the inverting input of the comparator 43. While the switch circuit 52 is turned on/off in phase with the switch circuit 49, the switch circuit 51 is turned on/off in opposite phase with the switch circuit 49. An output signal of the comparator 43 is outputted as a frequency signal OSCOUT through a buffer circuit 53. According to the temperature detection circuit 54, therefore, the A/D converter 14 of the temperature detection circuit 11 of the first embodiment is replaced with the oscillator circuit 46.

Figure 13A:
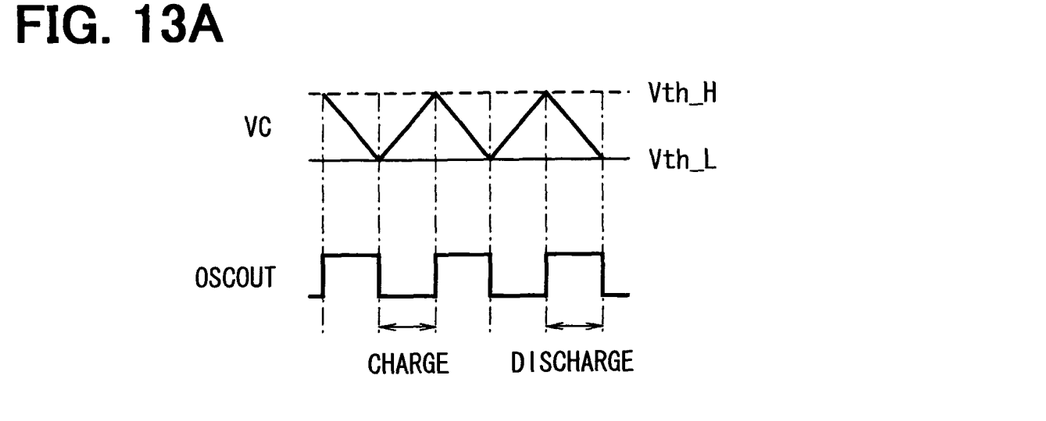
FIGS. 13A-13C are timing diagrams for a voltage across a capacitor and a frequency signal outputted from an oscillator circuit of the temperature detection circuit of FIG. 12.
Figure 13B:
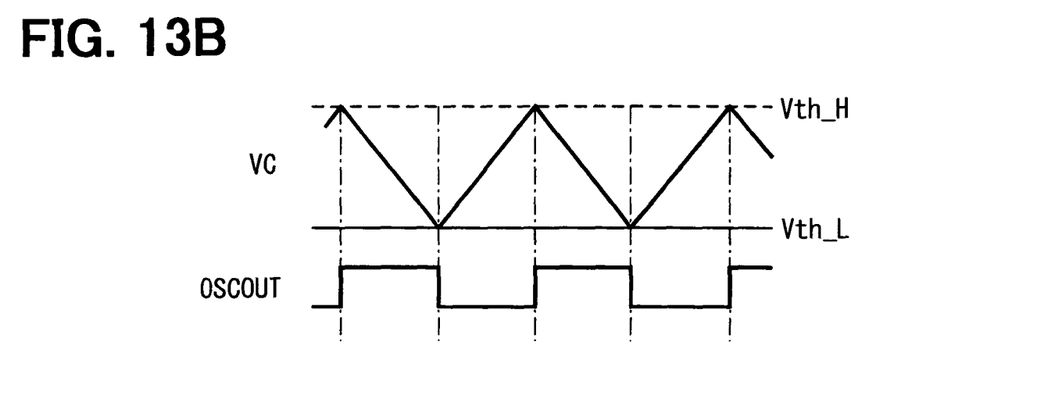
Figure 13C:
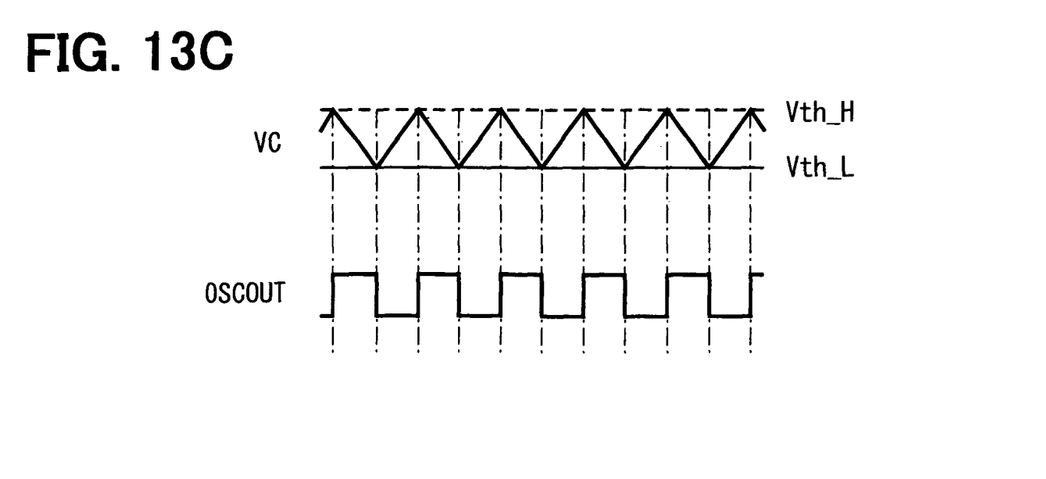

FIGS. 13A-13C show timing diagrams for a voltage VC across the capacitor 48 and the frequency signal OSCOUT. When the switch circuit 49 is turned on, the capacitor 48 is charged by an electric current I. In contrast, when the switch circuit 49 is turned off, the capacitor 48 is discharged by the electric current I.

When the output signal of the comparator 43 is high, the switch circuit 51 is turned off, and the switch circuit 52 is turned on. Therefore, the detection voltage Vout having a temperature dependence is applied as a threshold voltage Vth_L to the comparator 43. In contrast, when the output signal of the comparator 43 is low, the switch circuit 51 is turned on, and the switch circuit 52 is turned off. Therefore, a divided voltage of a reference voltage VREF having no temperature dependence is applied as a threshold voltage Vth_H to the comparator 43. As a result, the voltage VC across the capacitor 48 changes like a triangular wave as shown in FIG. 13A.

The threshold voltage Vth_L has the temperature dependence. Therefore, as shown in FIG. 13B, a voltage level of the threshold voltage Vth_L decreases at a low temperature. As a result, a frequency of the frequency signal OSCOUNT decreases at a low temperature. In contrast, as shown in FIG. 13C, the voltage level of the threshold voltage Vth_L increases at a high temperature. As a result, the frequency of the frequency signal OSCOUNT increases at the high temperature. Thus, the frequency of the frequency signal OSCOUNT changes with the temperature. An oscillation frequency F of the frequency signal OSCOUNT is given by:

$$F = \frac{(Vth\_H - Vth\_L) \cdot C}{I} \quad (5)$$

In the above equation 5, C represents a capacitance of the capacitor 48. Therefore, the temperature detected by the temperature detection circuit 54 can be measured by counting the number of pulses contained in the frequency signal OSCOUNT per unit time. Since the threshold voltage Vth_H is generated using the bandgap reference voltage VBG having no temperature dependence, and the threshold voltage Vth_L is generated using the detection voltage Vout having a temperature dependence, relative accuracy is improved so that the temperature detection circuit 54 can accurately detect a temperature.

The embodiments described above may be modified in various ways. For example, in the fifth embodiment, if there is no heat-generating element near the temperature detection circuit, a PN junction isolation structure can be employed.

Such changes and modifications are to be understood as being within the scope of the present invention as defined by the appended claims.

What is claimed is:

1. A temperature detection circuit comprising:
a bandgap reference voltage generation circuit for generating a first reference voltage, the bandgap reference voltage generation circuit including a current path to produce a thermal voltage and being configured to cause a bias current to flow through the current path, the current path having a first resistor;
a detection output circuit having a second resistor, the detection output circuit being configured to cause a mirror current of the bias current to flow through the second resistor; and
an output conversion circuit that uses a second reference voltage to convert a voltage drop across the second resistor to a predetermined output form representing a detected temperature,
wherein the first and second resistors are substantially identical in temperature dependence,
wherein the second reference voltage is generated from the first reference voltage,
wherein the bandgap reference voltage generation circuit and the detection output circuit include a plurality of bipolar transistors and a plurality of resistors, and
wherein each of the plurality of bipolar transistors has an emitter coupled to a power supply line through a corresponding one of the plurality of resistors.

2. The temperature detection circuit according to claim 1, wherein the each of the plurality of bipolar transistors has transistor members cascaded together.

3. The temperature detection circuit according to claim 1, wherein the bandgap reference voltage generation circuit and the detection output circuit are implemented on a silicon-on-insulator substrate, and
wherein each circuit element of the bandgap reference voltage generation circuit and the detection output circuit are disposed in a trench-isolated region of the silicon-on-insulator substrate.

4. The temperature detection circuit according to claim 1, wherein the bandgap reference voltage generation circuit and the detection output circuit include a plurality of transistors coupled to a power supply line, and
wherein each transistor has transistor members cascaded together.

5. The temperature detection circuit according to claim 1, wherein the output conversion circuit is an analog-to-digital converter.

6. The temperature detection circuit according to claim 1, wherein the output conversion circuit is a comparator.

7. A temperature detection circuit comprising:
a bandgap reference voltage generation circuit for generating a first reference voltage, the bandgap reference voltage generation circuit including a current path to produce a thermal voltage and being configured to cause a bias current to flow through the current path, the current path having a first resistor:
a detection output circuit having a second resistor, the detection output circuit being configured to cause a mirror current of the bias current to flow through the second resistor; and
an output conversion circuit that uses a second reference voltage to convert a voltage drop across the second resistor to a predetermined output form to detect a temperature,
wherein the first and second resistors are substantially identical in temperature dependence,
wherein the second reference voltage is generated from the first reference voltage,
wherein the bandgap reference voltage generation circuit and the detection output circuit include a plurality of bipolar transistors and a plurality of resistors, and
wherein each of the plurality of bipolar transistors has an emitter coupled to a power supply line through a corresponding one of the plurality of resistors.

8. The temperature detection circuit according to claim 7, wherein the each of the plurality of bipolar transistors has transistor members cascaded together.

9. The temperature detection circuit according to claim 7, wherein the bandgap reference voltage generation circuit and the detection output circuit are implemented on a silicon-on-insulator substrate, and
wherein each circuit element of the bandgap reference voltage generation circuit and the detection output circuit are disposed in a trench-isolated region of the silicon-on-insulator substrate.

* * * * *